Figure 1:
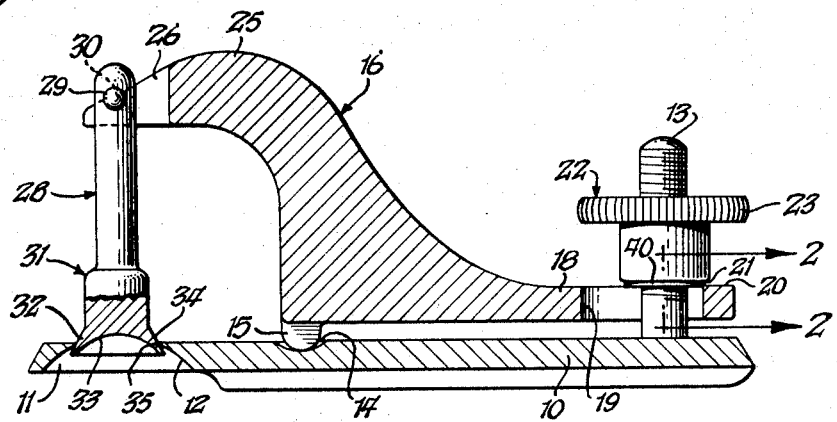

July 16, 1968  W. P. BONE ET AL  3,392,728
BLOODLESS CIRCUMCISION CLAMP PROVIDED WITH A STERILIZABLE
WASHER PERMANENTLY ATTACHED THERETO
Filed March 8, 1966

INVENTORS
WILLIAM P. BONE
HAROLD J. DUNKELMAN
JACK R. GUSTIN
BY
Popp and Sommer
ATTORNEYS

United States Patent Office 3,392,728
Patented July 16, 1968

3,392,728
BLOODLESS CIRCUMCISION CLAMP PROVIDED
WITH A STERILIZABLE WASHER PERMANENT-
LY ATTACHED THERETO
William P. Bone, Eggertsville, Harold J. Dunkelman,
Buffalo, and Jack R. Gustin, Williamsville, N.Y.,
assignors to Gomco Surgical Manufacturing Corp.,
Buffalo, N.Y., a corporation of New York
Filed Mar. 8, 1966, Ser. No. 532,757
5 Claims. (Cl. 128—346)

This invention relates to a bloodless circumcision clamp of the type having a manipulatable platform with a beveled opening against which the cup-shaped head of a pin is drawn by means of a bellcrank lever fulcrumed on the platform, manual pressure being applied to the bellcrank lever by means of a thumb nut on a stud bolt fixed to the platform and the thumb nut having a rotary bearing relation with the bellcrank lever.

In circumcision clamps of this type as heretofore produced, a loose fiber washer was interposed to provide the bearing surfaces between the opposing faces of the bellcrank lever and the rotary thumb nut acting on this bellcrank lever, this loose washer surrounding the stud screw. Such washer was required to provide the low and uniform friction characteristics, not only to permit ready clamping and locking in clamped position, but also to permit ready unlocking and release with a minimum of manual effort on the part of the physician. However, after each use it was necessary to sterilize the clamps in an autoclave usually at about 258° F. and at a gage pressure of 15 pounds. The fiber washers so used would not stand up under such pressures so it was required to remove them before placing the clamp in the autoclave. This involved, of course, the necessity for the unscrewing and complete removal of the thumb nut; removal of the fiber washer; partially reapplying the thumb nut, placing the clamp in the autoclave; suitably sanitizing the fiber washer and placing it to be available for reapplication; removing the clamp from the autoclave; permitting it to cool; removing the thumb nut; reapplying the sanitized fiber washer; and screwing the thumb nut back to its initial position for operation.

While these steps required care, time, effort and keeping track thereof, the most important difficulty encountered was that the fiber washer not infrequently was not removed and disintegrated in the autoclave, or was not replaced, with the result of a metal-to-metal contact between the nut and the bellcrank lever. The resultant grinding action roughened the opposing surfaces with the result that while no difficulty was experienced in closing and locking the clamp, it required tools, not conveniently available to a surgeon, to break the lock and release the clamp.

It is an object of the present invention to provide a bloodless circumcision clamp which does not require all of the above steps in sterilization, it being merely necessary to autoclave the entire assembled clamp.

It is a further object at the same time to provide a washer between the thumb nut and bellcrank lever having the required low coefficient of friction with excellent abrasion resistance and extreme resistance to corrosion, as well as to autoclave temperatures, so as to provide, without lubrication, the optimum manual closing, locking and opening characteristics.

Another object is to provide a clamp with such a washer permanently attached thereto, the washer having suitable dimensional stability for retaining attachment under conditions of use and autoclaving.

Another object is to retain all of the operational advantages of this type of instrument heretofore in use.

Figure 2:
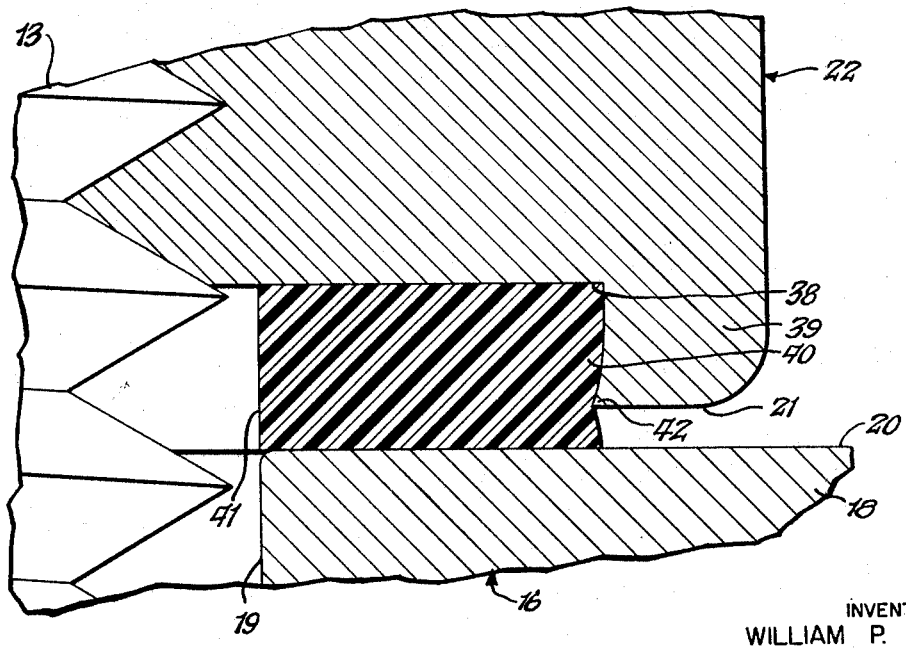

In the drawings, FIG. 1 is a vertical longitudinal central section, partly in elevation, through a circumcision clamp embodying the present invention and FIG. 2 is a greatly enlarged fragmentary vertical section taken on line 2—2, FIG. 1.

The clamp comprises a platform or base plate 10, preferably made of aluminum or other lightweight metal or alloy, and having at one end a bevelled through opening 11 extending vertically therethrough, the bevel 12 being such that the opening 11 enlarges downwardly and the opening being of a size approximately fitting the head of the penis of the patient.

At its opposite end the platform or base 10 has fixed thereto an upstanding stud bolt 13. Intermediate and in line with the opening 11 and stud bolt 13 the platform has an upwardly facing recess 14 fulcruming the foot 15 at the center of a bellcrank lever 16. This bellcrank lever is also preferably made of a lightweight metal and one arm 18 extends horizontally toward, and is apertured, as indicated at 19, to receive the upstanding stud bolt 13. The top surface 20 of this arm 18 of the bellcrank lever 16 opposes the under surface 21 of a thumb nut 22, this being shown as having an outwardly extending knurled flange 23 to facilitate manual turning of the thumb nut.

The other arm 25 of the bellcrank lever 16 arches upwardly from the foot 15 to position its end over the opening 11, this end being bifurcated, as indicated at 26, to receive the upper end of an upstanding pin 28. This pin is provided at its upper end with a small cross pin 29 adapted to lodge in cross recesses 30 provided on top of the arm 25 of the bellcrank lever 16 at opposite sides of the bifurcation 26 so that upward movement of this arm draws the pin 28 upwardly.

The bottom of the pin 28 is in the form of a bell or inverted cup-shaped cone 31 having a rim 32 which surrounds a downwardly opening recess 33 and which is larger in diameter than the top of the opening 11. The upper face 34 of this rim 32 is of downwardly enlarging cone shape, this face 34 coacting with an edge 35 of the upper part of the opening 11 in performing the operation.

The present invention is concerned with the provision of a face of suitable characteristics between the underside 21 of the thumb nut 22 and the top face 20 around the aperture through the arm 18 of the bellcrank lever 16. To provide this face, the underside 21 of the thumb nut is provided with a central, concentric, cylindrical recess 38, leaving a marginal depending wall 39. This recess 38 snugly receives a cylindrical washer or wear ring 40 having a central bore 41 of slightly larger diameter than the threaded bore of the thumb nut. After being inserted in the recess 38, the washer or wear ring 40 is retained therein by offsetting the bottom of the depending wall 39 toward the center of the thumb nut thereby to provide an annular tooth or sharp ridge 42 which is pressed into the periphery of the washer or wear ring 40.

The important feature of the invention resides in the composition of the washer or wear ring 40, it being made of polytetrafluoroethylene containing approximately 25% of a blend of ceramic type fillers to provide the required low coefficient of friction and dimensional stability. Sheets, from which the wear rings or washers 40 can be conveniently stamped out, are commercially available as a product designated Rulon A produced by Dixon Corporation of Bristol, R.I.

In the use of the clamp on the newborn, without anaesthesia, the dorsal aspect of the prepuce is put on a stretch by grasping it on either side of the median line with a pair of haemostats. The prepuce is then gently drawn backward. The inside 33 of the cone or bell 31 at the lower end of the pin 28, after being anointed, is placed over the head of the penis allowing enough of the mucous membrane to fit below the cone in order that too much of this tissue is not removed. The prepuce is then pulled through and above the beveled opening 11 in the platform 10 and the upper end of the pin 28 positioned in the bifurcation 26 of the bellcrank lever 16 with its cross pin 29 arranged above the recesses 30. The thumb nut 22 is then screwed down on the stud bolt 13, thereby, through the washer or wear ring 40, to exert downward pressure on the arm 18 of the bellcrank lever and through its fulcrum foot 15 to lift its other arm 25 into engagement with the cross pin 29 and thereafter to lift and exert upward pressure against the pin 28 and its cone or bell-shaped bottom 31. This crushes the prepuce between the cone surface 34 and edge 35 of the opening 11 in the platform causing haemostasis over all the blood vessels. This pressure is allowed to remain 5 minutes, and with older children slightly longer. The excess of the prepuce is then cut from above the platform 10 with a sharp knife without any danger of cutting the penis which is always protected by the cone portion 31 of the instrument. The wing nut 22 is then unscrewed to release the pin 28 and to release the remaining tissue from between the cone surface 34 and edge 35 of the opening 11 in the platform, the wear ring or washer 40 being particularly effective at this point in providing a low friction surface between the thumb nut 22 and the arm 18 of the bellcrank lever 16.

The entire instrument is then sterilized in an autoclave (not shown) at a temperature of, say, 258° F. and at a gage pressure of 15 pounds. The washer or wear ring 40 so made of polytetrafluoroethylene resin containing approximately 25% of a blend of ceramic type fillers to provide the required low coefficient of friction and dimensional stability is unaffected by such autoclave temperature and pressure, retaining its dimension without softening or other characteristics and without such flow as might release it from the sharp holding bead or ridge 42. Also such washer or wear ring 40 has the required low coefficient of friction to have free rotating contact with the face 20 of the arm 18 of the bellcrank lever 16 not only in bringing the instrument to its clamping condition and locking it in this condition for the required length of time, but also to release the instrument by the manual unscrewing of the thumb nut 22.

We claim:

1. A bloodless circumcision clamp comprising a manipulatable platform having an opening at one end adapted to receive the head of a penis, a stud bolt fixed to and projecting from one side face of said platform, a nut member on said stud bolt, a bellcrank lever fulcrumed on said one face of said platform between said opening and stud bolt and having one arm member apertured to fit around said stud bolt between said nut and platform and an opposite arm arranged in line with and spaced from said opening, a pin pivotally connected to the outboard end of said opposite arm, a bell-shaped head on said pin which has a generally cone-shaped surface of greater diameter than and movable toward and from said opening and the other side face of said platform, and a body of polytetrafluoroethylene containing approximately 25% of a blend of ceramic type fillers interposed between the opposing faces of said nut and arm members and providing a low friction, high abrasion resistant, smooth bearing surface therebetween, with such properties and also dimensional stability being maintained at temperatures and pressures used in autoclaving the clamp to sterilize the same.

2. A circumcision clamp as set forth in claim 1 wherein said body is in the form of a ring surrounding said stud bolt and fixed to one of said members.

3. A circumcision clamp as set forth in claim 1 wherein said body is in the form of a ring surrounding said stud bolt and fixed to one of said members.

4. A circumcision clamp as set forth in claim 1 wherein said body is in the form of a flat ring surrounding said stud bolt and set into a coaxial recess provided in the face of said nut opposing said arm member.

5. A circumcision clamp as set forth in claim 1 wherein said recess is generally cylindrical and the rim portion of said nut surrounding and forming said cylindrical recess is offset toward the center of the nut to provide an annular ridge embedded in the periphery of and securing said flat ring to said nut.

References Cited

UNITED STATES PATENTS

| | | | |
|---|---|---|---|
| 2,238,660 | 4/1941 | Santora | 128—346 |
| 2,646,046 | 7/1953 | Maryan | 128—346 |
| 3,166,075 | 1/1965 | Kebel | 128—346 |

OTHER REFERENCES

"Gomco Clamp"—form 27 (pamphlet), 1935.

DALTON L. TRULUCK, *Primary Examiner.*

UNITED STATES PATENT OFFICE
CERTIFICATE OF CORRECTION

Patent No. 3,392,728                            July 16, 1968

William P. Bone et al.

It is certified that error appears in the above identified patent and that said Letters Patent are hereby corrected as shown below:

Column 4, line 24, "one of said members" should read -- said nut member --.

Signed and sealed this 2nd day of December 1969.

(SEAL)
Attest:

Edward M. Fletcher, Jr.                      WILLIAM E. SCHUYLER, JR.
Attesting Officer                              Commissioner of Patents